(12) United States Patent
Obbard

(10) Patent No.: US 12,254,032 B2
(45) Date of Patent: Mar. 18, 2025

(54) SYSTEM AND METHOD FOR HYBRID MULTILINGUAL SEARCH INDEXING

(71) Applicant: OPEN TEXT CORPORATION, Waterloo (CA)

(72) Inventor: Geoffrey Michael Obbard, Waterloo (CA)

(73) Assignee: OPEN TEXT CORPORATION, Waterloo (CA)

(*) Notice: Subject to any disclaimer, the term of this patent is extended or adjusted under 35 U.S.C. 154(b) by 0 days.

(21) Appl. No.: 17/962,157

(22) Filed: Oct. 7, 2022

(65) Prior Publication Data

US 2024/0119076 A1    Apr. 11, 2024

(51) Int. Cl.
*G06F 16/33* (2019.01)
*G06F 16/31* (2019.01)
*G06F 16/3332* (2025.01)
*G06F 40/263* (2020.01)

(52) U.S. Cl.
CPC .......... *G06F 16/3337* (2019.01); *G06F 16/31* (2019.01); *G06F 40/263* (2020.01)

(58) Field of Classification Search
CPC ................................................ G06F 16/3337
USPC ........................................................ 707/760
See application file for complete search history.

(56) References Cited

U.S. PATENT DOCUMENTS

| | | | |
|---|---|---|---|
| 6,658,377 B1 | 12/2003 | Anward et al. | |
| 6,842,730 B1 | 1/2005 | Ejerhed et al. | |
| 10,762,139 B1* | 9/2020 | Dai | G06F 16/2246 |
| 2011/0131212 A1* | 6/2011 | Shikha | G06F 40/131 |
| | | | 704/8 |
| 2012/0095748 A1 | 4/2012 | Li et al. | |
| 2013/0339378 A1* | 12/2013 | Zheng | G06F 16/3337 |
| | | | 707/760 |
| 2017/0078199 A1* | 3/2017 | Mosko | H04L 63/12 |
| 2017/0364510 A1 | 12/2017 | Huang et al. | |
| 2018/0330012 A1* | 11/2018 | Hopkins | G06F 16/9538 |
| 2019/0108279 A1 | 4/2019 | Moore et al. | |
| 2021/0334299 A1 | 10/2021 | Sonntag et al. | |
| 2024/0119070 A1 | 4/2024 | Obbard | |

FOREIGN PATENT DOCUMENTS

EP    2807535    9/2019

OTHER PUBLICATIONS

Eric Brill., "A Simple Rule-Based Part of Speech Tagge" ANLC '92: Proceedings of the third conference on Applied natural language processing, Mar. 1992, pp. 152-155.

Nguyen et al., "RDRPOSTagger: A Ripple Down Rules-based Part-Of-Speech Tagger", Proceedings of the Demonstrations at the 14th Conference of the European Chapter of the Association for Computational Linguistics, pp. 17-20, Gothenburg, Sweden, Apr. 26-30, 2014. © 2014 Association for Computational Linguistics.

International Search Report and Written Opinion issued by the Canadian Intellectual Property Office as the International Searching Authority (CA/ISA) for International PCT Application No. PCT/IB2023/060075, mailed Dec. 14, 2023, 11 pages.

(Continued)

Primary Examiner — Muluemebet Gurmu
(74) Attorney, Agent, or Firm — Sprinkle IP Law Group

(57) ABSTRACT

System and method for the indexing and searching of multilingual documents are disclosed.

21 Claims, 7 Drawing Sheets

(56) References Cited

OTHER PUBLICATIONS

LemmatizerME.txt, Apache Software Foundation, retrieved at <<opennlp/opennlp-tools/src/main/java/opennlp/tools/lemmatizer/LemmatizerME.java at main•apache/opennlp•GitHub>>, 7 pages.

Dat Quoc Nguyen et al., "Ripple Down Rules for Part-of-Speech Tagging," In Proc. of 12th CICLing—vol. Part I, Feb. 2011, pp. 190-201.

Dat Quoc Nguyen, et al., "RDRPOSTAGGER: Ripple Down Rules-Based Part-of-Speech Tagger," The Demonstrations at the 14$^{th}$ Conference of the European Chapter of the Association for Computational Linguistics, Apr. 2014, pp. 17-20.

Eric Brill, "A Simple Rule-Based Part of Speech Tagger," ANLC '92: Proceedings of the third conference on Applied natural language processing, Mar. 1992, pp. 152-155.

Grzegorz Chrupała, "Towards a Machine-Learning Architecture for Lexical Functional Grammar Parsing," Dublin City University, Apr. 2008, 136 pages.

Office Action issued by the United States Patent and Trademark Office (USPTO) for U.S. Appl. No. 17/962,177, mailed Sep. 29, 2024, 14 pages.

\* cited by examiner

SYSTEM AND METHOD FOR HYBRID MULTILINGUAL SEARCH INDEXING

TECHNICAL FIELD

This disclosure relates generally to computerized search systems. In particular, this disclosure relates to the search systems for searching multilingual objects. Even more specifically, this disclosure relates to effective and efficient indexing and searching of multilingual objects.

BACKGROUND

A search engine is a computer program used to index electronically stored information (referred to as a corpus) and search the indexed electronic information to return electronically stored information responsive to a search. Items of electronic information that form the corpus may be referred to interchangeably as (electronic) documents, files, objects, items, content, etc. and may include objects such as files of almost any type including document for various editing applications, emails, workflows, etc. In a conventional search engine, a user submits a query and the search engine selects a set of results from the corpus based on the terms of the search query. The terms of search queries usually specify words, terms, phrases, logical relationships, fields to be searched, synonyms, variations, etc.

Often times the documents being indexed and searched may include objects having content in multiple languages. Moreover, this multilingual content may be included within the same document. Thus, a single document may include content in multiple languages. Current search systems are both inefficient and ineffective when it comes to such multilingual documents.

SUMMARY

As discussed, objects being indexed and searched in a search system may include objects having content in multiple languages where a single object may include content in multiple languages. Search systems may be both inefficient and ineffective when it comes to such multilingual documents.

To illustrate in more detail, indexing of objects is usually accomplished by performing language analysis of the object that results in a set of tokens (and associated positional information) to be indexed for an object. This language analysis involves the tokenization of the content of the object followed by the actual language processing to determine the tokens of the object actually being indexed (e.g., case conversion, accent folding, normalization, stemming, lemmatization, etc.). This same language analysis may be performed on a search query to determine search terms (e.g., the tokens resulting from performing language analysis on the search query) to be utilized when searching objects. Thus, the index time and the query time language analysis should match to obtain accurate search results. As may be imagined, this language analysis is heavily dependent on the language being analyzed. The analysis of text in one language using language analysis adapted for a different language will thus result in the production of an improper or non-sensical set of tokens.

Accordingly, to deal with multilingual objects, a number of approaches are used. One approach is to maintain separate search systems (or sites) specific to each language. Thus, objects at each site are indexed and searched according to the associated language. For example, a website from a provider at a ".fr" domain may index objects according to French such that those documents can be effectively searched using French, while a website from the same provider at a "de" domain may index objects according to German such that those documents can be searched using German, etc. As can be realized, such an architecture is extremely inefficient, as it requires the separate indexing of all documents according to each language it is desired to support, maintaining a separate index for each language for all of those documents, and the maintenance of a separate interface/site for each of those languages.

Another approach to handle multilingual documents is to use a single language per object methodology. In this approach, when an object is received some language identification methodology is employed to identify the language of the document. Usually an initial portion of the object is sampled and a language identification methodology is applied to this initial portion to identify the language. A language analysis associated with the identified language is then applied to index the object. Similarly, a language identification methodology is applied to a search query and a language analysis associated with a language identified for the search query used to determine search terms to utilize when searching. In this manner, only a single language analysis is applied to index documents and to determine search terms based on a search query.

As a consequence, these single language approaches are heavily dependent on accurate language detection for both the indexing of the object and the search query (e.g., both precision and recall may be reduced if language is improperly detected). Moreover, for objects that include content in multiple languages, the included content that is in any other language than the single language identified to index that document may be mis-analyzed and mis-indexed (e.g., the content in languages other than the identified language is linguistically analyzed using language analysis adapted for a different language (i.e., the identified language) and the tokens from that improper analysis indexed for that object). Thus, any content of these multilingual documents that is in any language differing from the single identified language for the object cannot be effectively searched, as it has been (mis) indexed using language analysis adapted for another language. Additionally, this ineffectiveness may be exacerbated when the differing languages are linguistically far apart, such when content from a language using a Latin alphabet is included in a document with content in a language based on other characters (e.g., such as Chinese, Japanese, or Korean (CJK)).

As can be seen, these approaches to dealing with multiple language documents are each problematic in their own way. Some approaches sacrifice the effectiveness of the search system (e.g., with respect to precision or recall) in certain contexts while others make inefficient use of storage space or other computer resources by requiring the processing of entire objects according to different language analysis processes and the storage of large indexes (or portions of indexes) that include the results (the extracted tokens) of each of these different language analyses.

What is desired then are improved search systems that may deal with multilingual objects in an efficient and effective manner.

To those ends, among others, attention is now directed to embodiments of a multilingual search system as disclosed herein. These multilingual search systems may analyze objects (and thus similarly search queries) using a multilingual object analyzer that fragments the text (content) of the object into one or more fragments. While almost any type of fragmentation desired may be utilized to determine fragments of text, in one embodiment this fragmentation can be based on a sentence boundary detection model using Natural Language Processing (NLP) or the like. Such a model may, for example, be based on Apache's OpenNLP (e.g., may be a pluggable model that can be trained and provided).

In one embodiment, such a sentence boundary detection model may be trained based on sentence markers for multiple languages (which be the same as, or a subset or superset of, the languages supported by the multilingual search system). These sentence markers may be sentence markers from, for example, Japanese, Korean, Chinese (CJK), or other languages which do not use a period (or whitespace in certain contexts) to delineate the end of a sentence. Similarly, in some cases then, before fragmentation is performed on the text of the object, a pre-splitting of the text may be performed by splitting (e.g., by inserting whitespace or another character or marker) into the text where certain characters delineating the end of a sentence (e.g., such as in Japanese, Chinese or Korean) occur in the text. Such pre-splitting may thus make the fragmentation of the text of the object more effective.

For each of those fragments, a language detection may be performed to identify a language associated with each fragment. Again, such language detection may be performed based on a language detection model, where the language detection model may be a (e.g., pluggable) model based on Apache's OpenNLP. Once the language is identified for that fragment, the fragment can be provided to a language analyzer for the identified language. The tokens for that fragment identified by that language analysis can then be indexed for that object. In this manner, all the tokens identified for each of the fragments by the respective language analyzer used for each fragment may be stored for the object and indexed to create a multilingual index. Similarly, the set of objects of the corpus may be searched by providing a search query to the multilingual object analyzer such that the search query is fragmented (if needed) into one or more fragments such that language detection and analysis can be performed on each of those fragments to determine the search terms. These search terms can then be applied against the multilingual index to determine the search results.

Advantageously, embodiments may allow the efficient implementation of multilingual search. Specifically, when language detection or analysis fails it may fail only for a particular fragment (e.g., not for the entire document). Thus, the document may be effectively indexed and subsequently searched even when such detection or analysis fails for a fragment.

Additionally, certain embodiments may utilize search engines that utilize fields to store various aspects of objects and that analyze objects using analysis chains associated with such fields to create indexes based on such fields. Example of such search engines are Apache's Solr and Elasticsearch. The implementation of embodiments as disclosed may advantageously allow the storage of multilingual tokens of an object to be associated with a single field for an object and thus may allow a multilingual search index to be built based on this single field associated for the object. This capability thus additionally allows a single analysis chain to be implemented in association with such a field where that single analysis chain can implement multilingual analysis for the content of that object.

Moreover, the architecture of such multilingual search systems allows the simple extensibility of such search systems by allowing users or other third parties to easily expand the multilingual search system to process documents including almost any language desired. In particular, third parties (e.g., users of such search system) can provide a language analysis and language identification model for the language desired by including them in (e.g., plugging them into) the identification and analysis phases of the indexing to get support for the desired language without altering the architecture (e.g., the analysis chain) for the search system.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore non-limiting, embodiments illustrated in the drawings, wherein identical reference numerals designate the same components. Note that the features illustrated in the drawings are not necessarily drawn to scale.

DETAILED DESCRIPTION

The disclosure and various features and advantageous details thereof are explained more fully with reference to the exemplary, and therefore non-limiting, embodiments illustrated in the accompanying drawings and detailed in the following description. It should be understood, however, that the detailed description and the specific examples are given by way of illustration only and not by way of limitation. Descriptions of known programming techniques, computer software, hardware, operating platforms and protocols may be omitted so as not to unnecessarily obscure the disclosure in detail. Various substitutions, modifications, additions and/or rearrangements within the spirit and/or scope of the underlying inventive concept will become apparent to those skilled in the art from this disclosure.

Before discussing embodiments in detail, some context may be useful. As discussed, a search engine is a computer program or a set of programs used to index information (referred to as a corpus) and search for indexed information. In a conventional search engine, a user submits a query and the search engine selects a set of results from the corpus based on the terms of the search query.

Figure 1:
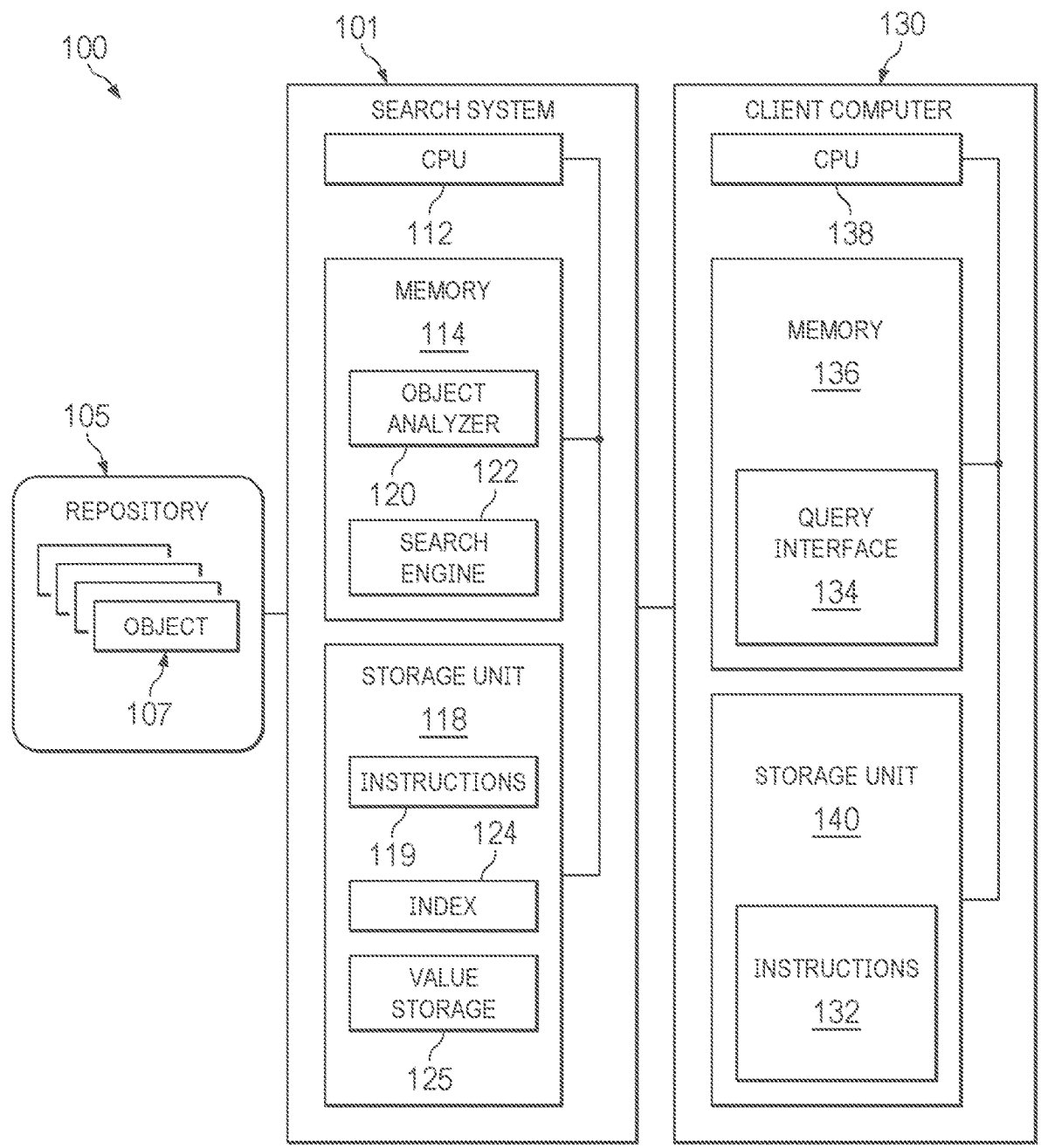
FIG. 1 is a block diagram depicting a computing environment in which one embodiment of a search system can be implemented.

FIG. 1 depicts a block diagram illustrating one embodiment of a computing environment 100 with object search system 101. Computing environment 100 includes an object repository 105 storing a corpus of objects 107 of interest (documents, images, emails or other objects that may be searched). Object repository 105 may comprise a file server or database system or other storage mechanism remotely or locally accessible by search system 101.

In the embodiment of FIG. 1, search system 101 comprises a server having a central processing unit 112 connected to a memory 114 and storage unit 118 via a bus. Central processing unit 112 may represent a single processor, multiple processors, a processor(s) with multiple processing cores and the like. Storage unit 118 may include a non-transitory storage medium such as hard-disk drives, flash memory devices, optical media and the like. Search system 101 may be connected to a data communications network (not shown).

Storage unit 118 stores computer executable instructions 119, index 124, and value storage 125. Computer executable instructions 119 can represent multiple programs and operating system code. In one embodiment, instructions 119 are executable to provide an object analyzer 120 and search engine 122. Object analyzer 120 and search engine 122 may be portions of the same program or may be separate programs. According to one embodiment, for example, object analyzer 120 is a component of one system while search engine 122 is a separate program that interfaces with another system. Furthermore, object analyzer 120 and search engine 122 can be implemented on different computing systems and can, themselves, be distributed.

Index 124 may include text (e.g., tokens) for objects. Index 124 can include a single index containing metadata and text, separate metadata and text indices or other arrangements of information. While shown as a single index, index 124 may include multiple indices. Further, index 124 may be associated with a particular field defined for objects such that the index 124 may include tokens determined for that field for each object.

In one embodiment, search engine 122 may utilize fields associated with aspects of objects and analyze objects using analysis chains associated with such fields to create index 124 based on such fields. Example of such search engines are Apache's Solr and Elasticsearch. Thus, in such an embodiment, object analyzer 120 may comprise an analysis chain associated with a field (e.g., a single field such as a text field) defined for objects 107 of the corpus stored in repository 105.

Client computer system 130 may include components similar to those of the server of search system 101, such as CPU 138, memory 136, and storage 140. Additionally, client computer system 130 may include executable instructions 132 to provide a user interface 134 that allows a user to enter a search query. The user interface may be provided through a web browser, file system interface or other program.

In operation, object analyzer 120 analyzes objects in object repository 105 to determine information to be indexed in index 124 or to analyze search queries received through the query interface 134. Object analyzer 120 can send indexing instructions to search engine 122 to direct search engine 122 to add/modify/delete metadata or text in index 124. As an example, suppose object 107 being added to search system 101 is a text file, the text or content of the file is indexed as well as information about the file. When a search query is received, search engine 122 can search the information in index 124 to identify objects responsive to the search query and return a list or other representation of those objects to client computer 130.

In particular, as will be discussed in more detail, object analyzer 120 may be a multilingual object analyzer adapted to determine tokens to index (or search terms) for multilingual objects 107. Thus, in instances where object analyzer 120 is an analysis chain associated with a field (e.g., a single field such as a text field) defined for objects 107, these determined tokens may be multilingual tokens associated with a field for that object 107 and used to create a hybrid index 124 (e.g., an index comprising tokens determine according to analysis of the content of an object according to multiple languages) associated with the field.

Figure 2:
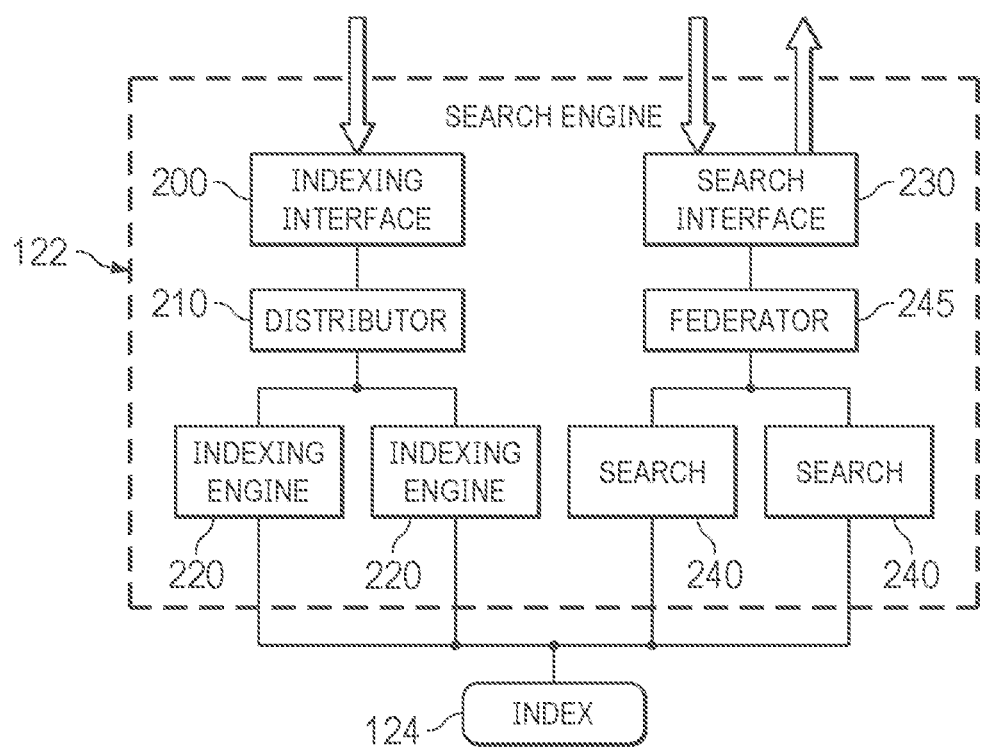
FIG. 2 is a block diagram depicting one embodiment of a search engine.

FIG. 2 depicts a diagrammatic representation of logical blocks for one embodiment of a search engine 122. Search engine 122 may provide an indexing interface 200 that receives indexing requests for objects or another source. Such an indexing request may specify an operation to be taken on index 124 for an object and data (e.g., such as tokens for the object being indexed) for that action. For context, an application that generates an indexing request may be a document management system, a web site with a search capability such as an online store, or a desktop search program for email.

According to one embodiment, for example, an indexing request can take the form of an indexing object that includes a unique identification for an object, an operation, a metadata or text field affected and the metadata or text for the index. By way of example, but not limitation, indexing operations may include adding, replacing, modifying and deleting information in the index, or combinations thereof.

A distributor module 210 may distribute the indexing requests to indexing engine 220 that acts on an indexing request to update index 124. This indexing engine 220 can thus determine the tokens to pass to the index 124 for the object using the object analyzer 120 or an indexing request may include the tokens to add to index 124 as determined by the object analyzer 120.

Search engine 122 may also include a search interface 230 to receive queries. Search interface 230 may be configured to receive a search query, such that index 124 can be used to search for objects that meet the criteria set forth in the search query. Specifically, search interface 230 may utilize an object analyzer to actually determine search terms to utilize for the received search query and provide those search terms to a search module 240. Search modules 240 are responsible for performing searches on an index 124, and performing tasks such as computing relevance score, sorting results, and retrieving metadata regions to return in a query. Federator 245 gathers the results from all search modules together, and generates a response to the query received through search interface 230.

The embodiment of FIG. 2 is provided by way of example. Search engine 122 may include any number of other modules or configurations to update and search an index. For example, search modules 240 and indexing engines 220 may be a single module. Search engine 122 may be a portion of a larger program, such as a document management program, may be a separate program or may be implemented according to any suitable programming architecture. In one embodiment, the processes of search engine 122 may be distributed across multiple computer systems. Furthermore, while in FIG. 2, index 124 is illustrated as a single index, index 124 may comprise a set of smaller indexes. For example, a separate index could be used by each indexing engine.

Figure 3A:
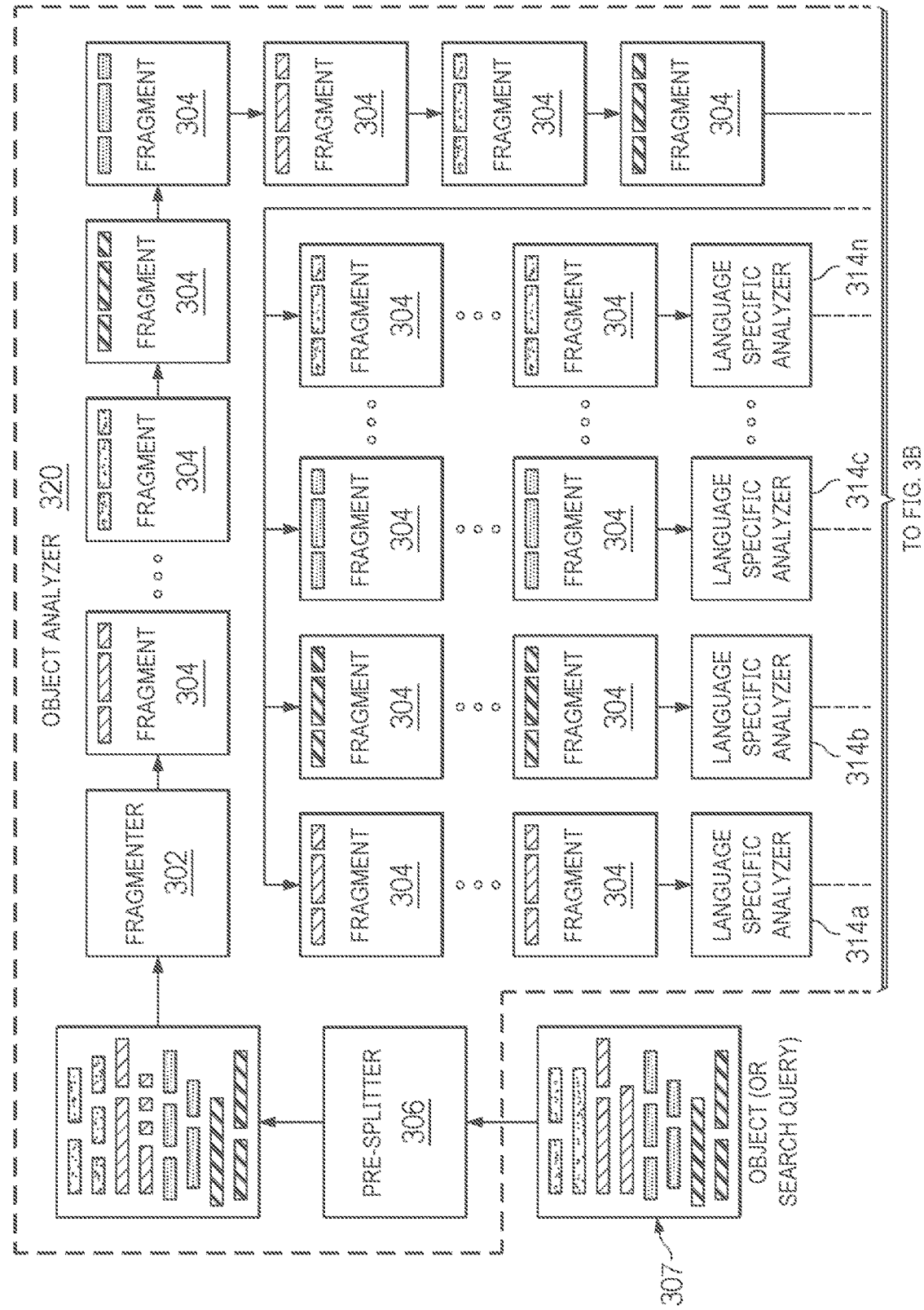
FIGS. 3A and 3B are block diagrams depicting one embodiment of an object analyzer.
Figure 3B:
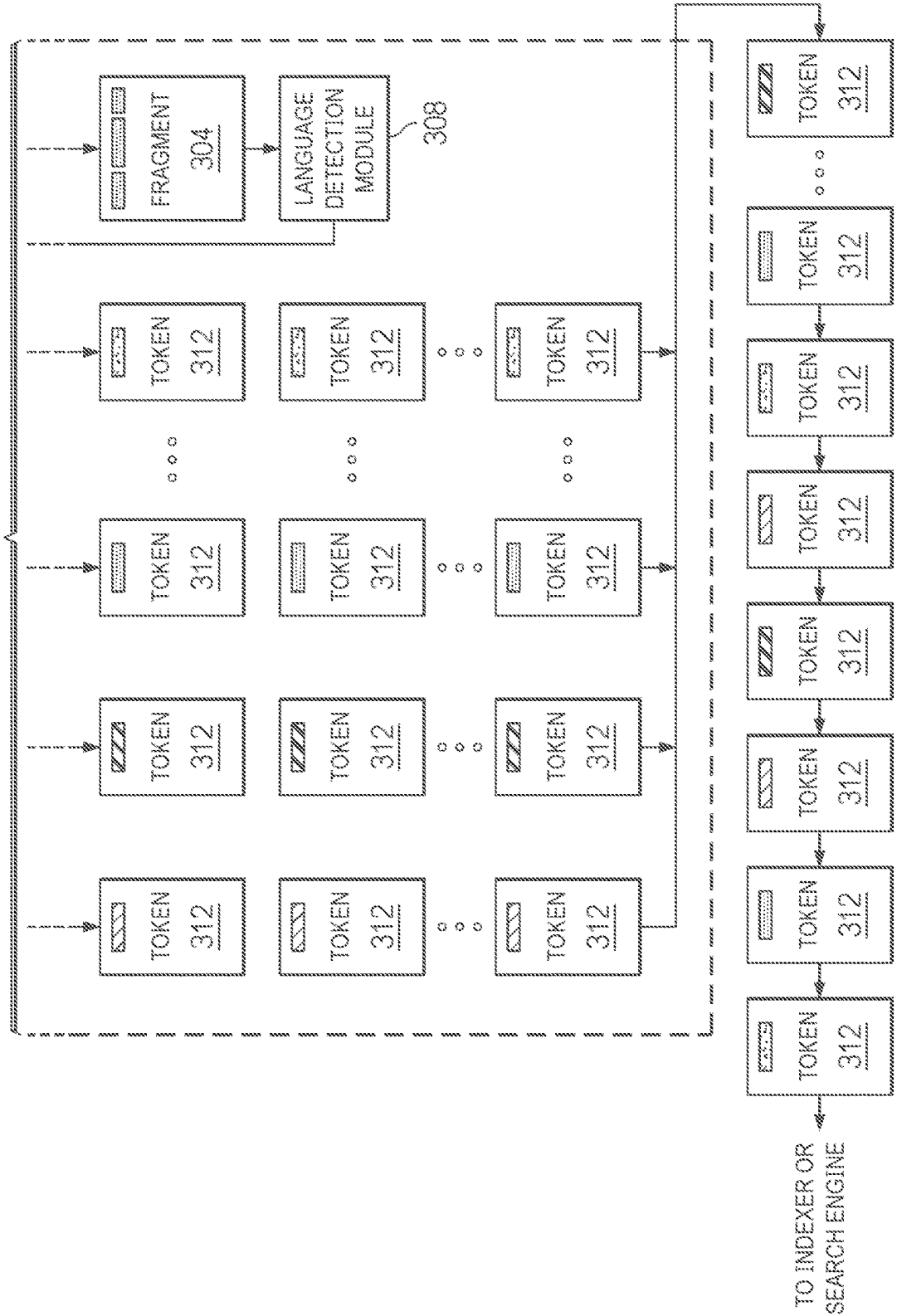

Referring now to FIGS. 3A and 3B, a block diagram of one embodiment of a multilingual object analyzer 320 that may be employed to determine tokens to index for an object, or search terms for a search query is depicted. Here, the object to be indexed (e.g., the content of the object) 307 or the search query is provided to the object analyzer 320. This object 307 may include text in multiple languages. It will be noted here that while embodiments as described with respect to FIGS. 3A and 3B will be described with respect to an object, it will be noted that such descriptions may apply equally well to the analysis of search queries in the context of performing analysis of such search queries to determine search terms of such queries.

Fragmenter 302 fragments the text (content) of the object 307 into one or more fragments 304. While almost any type of fragmentation desired may be utilized to determine fragments of text, in one embodiment this fragmentation can be based on a sentence boundary detection model using Natural Language Processing (NLP) or the like. Such a model may, for example, be based on Apache's OpenNLP (e.g., may be a pluggable model that can be trained and provided).

In one embodiment, such a sentence boundary detection model may be trained based on sentence markers for multiple languages (which be the same as, or a subset or superset of, the languages supported by the multilingual search system). These sentence markers may be sentence markers from, for example, Japanese, Korean, Chinese, or other languages which do not use a period (or whitespace in certain contexts) to delineate the end of a sentence.

Similarly, in some cases then, before fragmenter 302 is applied to the text of the object 307, a pre-splitting of the text may be performed by pre-splitter 306 by splitting (e.g., by inserting whitespace or another character or marker) into the text where certain characters delineating the end of a sentence (e.g., such as in Japanese, Chinese or Koran) occur in the text. Such pre-splitting may thus make the fragmentation of the text of the object by fragmenter 302 more effective.

For each of those fragments 304, a language detection may be performed by language detection module 308 to identify a language associated with each fragment 304. This language detection may be performed based on a language detection model, where the language detection model may be a (e.g., pluggable) model based on Apache's OpenNLP.

Once the language is identified for a fragment 304, the fragment can be provided to a language analyzer 314 for the language identified for that fragment 304 (e.g., language analyzer 314*a* may be for German, analyzer 314*b* for French, 314*c* for English, 314*n* for Greek, etc.). Thus, each fragment 304 is analyzed by a language analyzer 314 adapted for the language of that fragment 304 and that fragment of text of the object 307 analyzed according to a language analyzer 314 appropriate for that language. The tokens 312 for that fragment identified by that language analyzer 314 can then be indexed for that object 307. In this manner, all the tokens 312 identified for each of the fragments by the respective language analyzer 314 used for each fragment 304 may be stored for the object 307 and indexed to create a multilingual index (or provided to the search module or interface for conducting a search).

In some embodiment, object analyzer may be implemented as (or as part of) an analysis chain for a field associated with objects of a search system. As such, the architecture of object analyzer may be extensible by allowing users or other third parties to easily expand the object analyzer to process objects based on almost any language desired. In particular, third parties (e.g., users of such search system) can provide a language analysis or language identification model for the language desired by including them in (e.g., plugging them into) the identification and analysis phases of the object analyzer to get support for the desired language without altering the architecture of the object analyzer 320 (e.g., the analysis chain).

Figure 4:
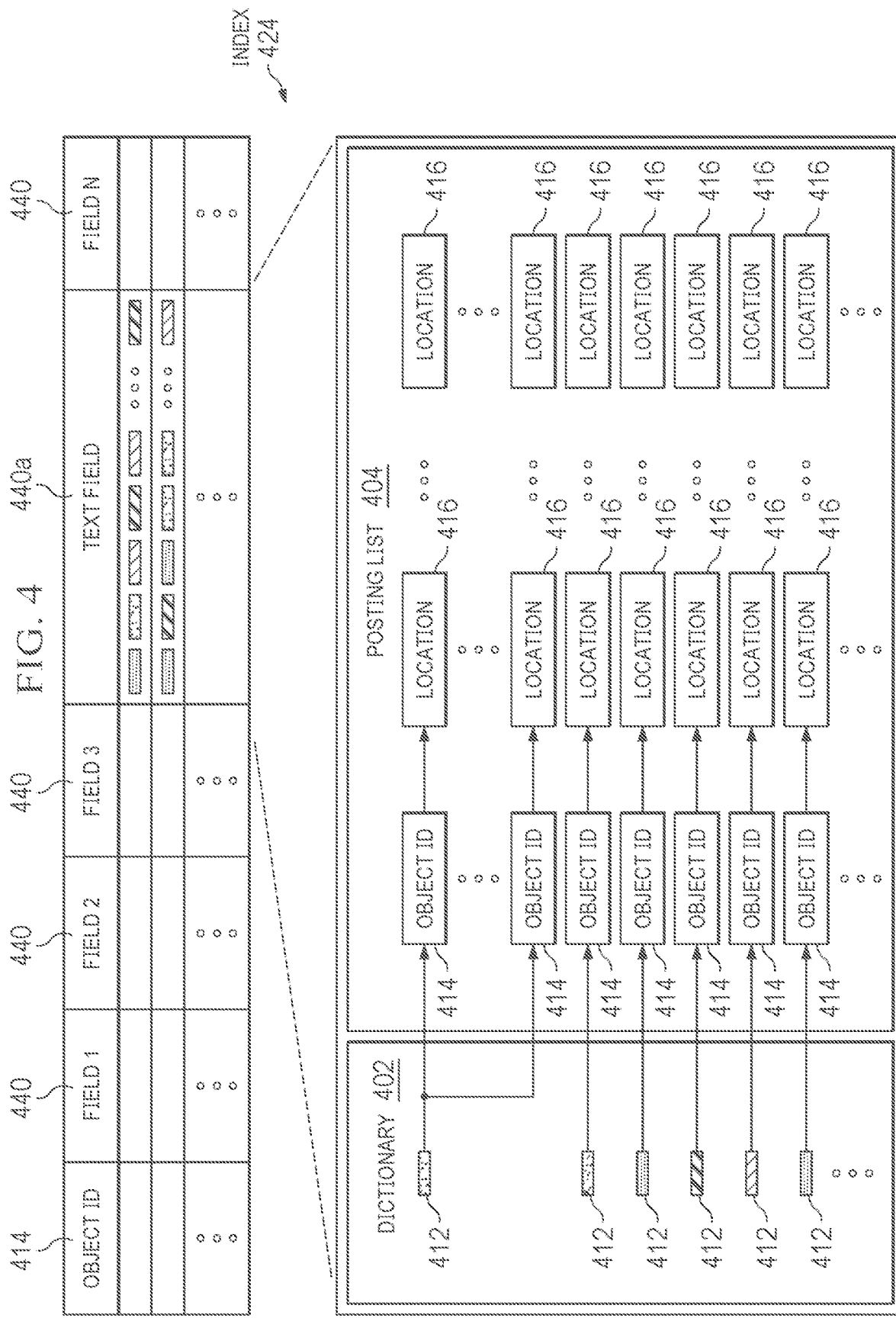
FIG. 4 is a block diagram depicting an index.

FIG. 4 depicts one embodiment of a multilingual index. In one embodiment, for example, this index 424 (e.g., which may be a portion of a larger index utilized by a search system) may be associated with a single field 440*a* used for object analysis in a search engine such as Apache Solr, Elasticsearch or the like. Each object in the corpus may have an associated object identifier 414 (e.g., from which the object in the corpus can be located or obtained). This object identifier 414 can be associated with a set of fields 440, one of which may be a text field 440*a* associated with tokens 412 determined from the respective object identified by the object identifier 414. An analysis chain may be associated with the text field 440*a* (e.g., such as an analysis chain implemented by an embodiment of an object analyzer as discussed).

Thus, such a multilingual index 424 may include the tokens 412 for that field 440*a* for each (or a subset) of the objects of the corpus that result from performing the analysis chain associated with the (e.g., single) field 440*a* on objects in the search system. Here, index 424 may include a dictionary 402 and a posting list 404. The dictionary 402 may include tokens 412 determined for each object (e.g., by the multilingual object analyzer as described), such that the index 424 includes the tokens 412 determined for all the objects of the corpus that have been indexed. It will be noticed here that a (e.g., single) field 440*a* and corresponding dictionary 402 includes tokens 412 from multiple languages determined according to their respective associated linguistic analysis for the corresponding language. Each of the tokens 412 may be associated with one or more entries in the posting list 404. Each entry in the posting list 404 includes an object identifier 414 of an object in which the associated token 412 appears, along with an identifier of each location 416 in that object where that token 412 appears.

Figure 5A:
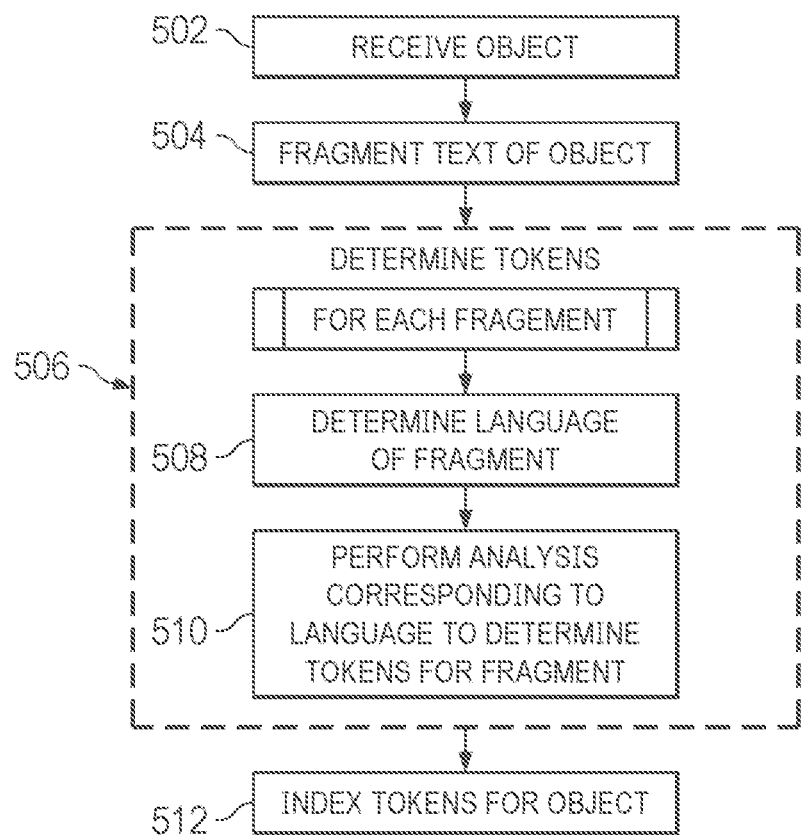
FIGS. 5A and 5B are flow diagrams depicting embodiments of methods for the indexing and search of multilingual documents.

Looking now at FIG. 5A, a flow diagram for one embodiment of a method for creation of a multilingual index for objects of an index is depicted. Here, the (each) object to be indexed (e.g., the content of the object) may be received (STEP 502). This object may (or may not) include text in multiple languages. The object can be provided to an object analyzer. The object analyzer may, for example, be implemented as an analysis chain for a single field associated with the object in the search system.

The text (content) of the object can be fragmented into one or more fragments (STEP 504). While almost any type of fragmentation desired may be utilized to determine fragments of text, in one embodiment this fragmentation can be based on a sentence boundary detection model using Natural Language Processing (NLP) or the like. Such a model may, for example, be based on Apache's OpenNLP (e.g., may be a pluggable model that can be trained and provided).

In one embodiment, such a sentence boundary detection model may be trained based on sentence markers for multiple languages (which be the same as, or a subset or superset of, the languages supported by the multilingual search system). These sentence markers may be sentence markers from, for example, Japanese, Korean, Chinese, or other languages which do not use a period (or whitespace in certain contexts) to delineate the end of a sentence.

Similarly, in some cases then, before fragmenting the text of the object, a pre-splitting of the text may be performed by splitting (e.g., by inserting whitespace or another character or marker) into the text where certain characters delineating the end of a sentence (e.g., such as in Japanese, Chinese or Koran) occur in the text. Such pre-splitting may make the fragmentation of the text of the object more effective.

The tokens associated with each of those fragments can then be determined (STEP 506). Specifically, for each fragment a language detection may be performed to identify a language associated with that fragment (STEP 508). This language detection may be performed based on a language detection model, where the language detection model may be a (e.g., pluggable) model based on Apache's OpenNLP.

Once the language is determined for the fragment, a language analyzer corresponding to the identified language may be applied to the text of that fragment to determine the tokens for that fragment (STEP 510) Thus, each fragment is analyzed by a language analyzer adapted for the language of that fragment, and that fragment of text of the object analyzed according to a language analyzer for that language. The tokens determined for each of the fragments of the objects (e.g., by applying appropriate language analysis to each fragment) can then be indexed (STEP 512). In this manner, all the tokens identified for each of the fragments by the respective language analyzer used for each fragment may be stored for the object and indexed to create a multilingual index (or provided to the search module or interface for conducting a search).

Figure 5B:
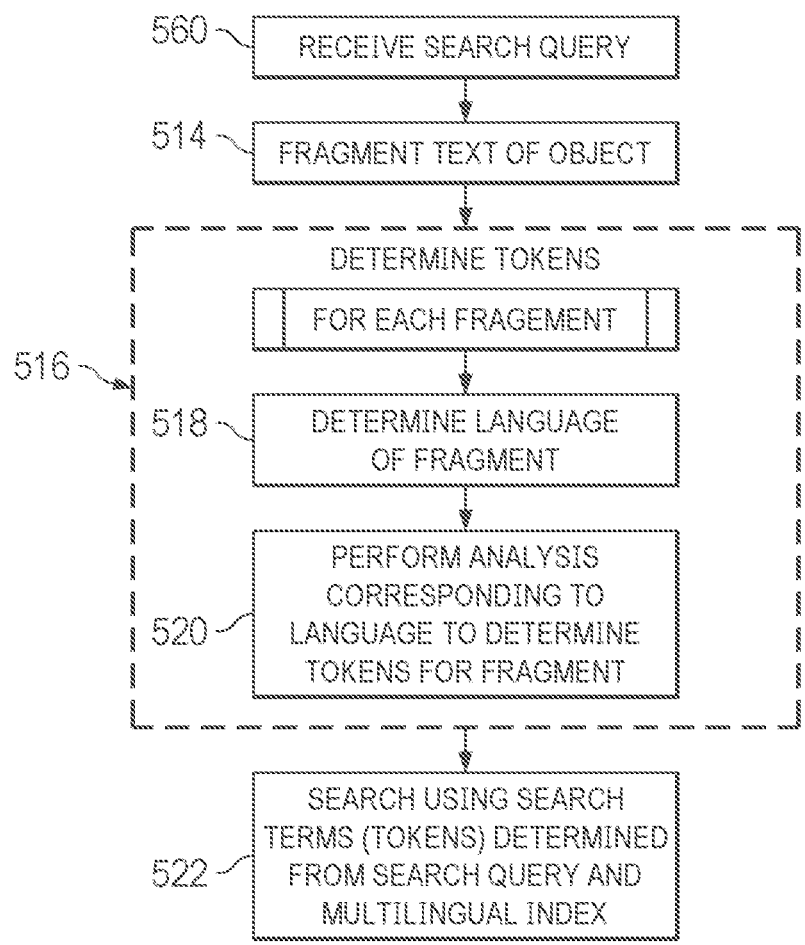

It will be apparent that a similar analysis may be performed for a search query to perform a search for objects using such a multilingual search index. FIG. 5B depicts a flow diagram for one embodiment of a method for searching for objects using a multilingual index. Initially, a search query may be received (e.g., through a search interface or the like) (STEP 560). A similar analysis to that used to determine the tokens for an object may then be applied to determine the terms of the search query to be used to perform the search. In particular, the search query may be provided to the same (or a similar) object analyzer as that used for the objects of the search system.

The text of the search query can thus fragmented into one or more fragments (STEP 514) and the tokens associated with each of those fragments determined (STEP 516) by identifying a language associated with that fragment (STEP 518) using a language detection model. A language analyzer corresponding to the identified language may then be applied to the text of that fragment of the search query to determine the tokens for that fragment (STEP 520). The tokens determined for each of the fragments of the search query can then be used as search terms to search the objects of the search system using the multilingual index (STEP 522).

Although the invention has been described with respect to specific embodiments thereof, these embodiments are merely illustrative, and not restrictive of the invention. The description herein of illustrated embodiments of the invention is not intended to be exhaustive or to limit the invention to the precise forms disclosed herein (and in particular, the inclusion of any particular embodiment, feature or function is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention.

Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Embodiments discussed herein can be implemented in a computer communicatively coupled to a network (for example, the Internet), another computer, or in a standalone computer. As is known to those skilled in the art, a suitable computer can include a central processing unit ("CPU"), at least one read-only memory ("ROM"), at least one random access memory ("RAM"), at least one hard drive ("HD"), and one or more input/output ("I/O") device(s). The I/O devices can include a keyboard, monitor, printer, electronic pointing device (for example, mouse, trackball, stylus, touch pad, etc.), or the like.

ROM, RAM, and HD are computer memories for storing computer-executable instructions executable by the CPU or capable of being compiled or interpreted to be executable by the CPU. Suitable computer-executable instructions may reside on a computer readable medium (e.g., ROM, RAM, and/or HD), hardware circuitry or the like, or any combination thereof. Within this disclosure, the term "computer readable medium" is not limited to ROM, RAM, and HD and can include any type of data storage medium that can be read by a processor. For example, a computer-readable medium may refer to a data cartridge, a data backup magnetic tape, a floppy diskette, a flash memory drive, an optical data storage drive, a CD-ROM, ROM, RAM, HD, or the like. The processes described herein may be implemented in suitable computer-executable instructions that may reside on a computer readable medium (for example, a disk, CD-ROM, a memory, etc.). Alternatively, the computer-executable instructions may be stored as software code components on a direct access storage device array, magnetic tape, floppy diskette, optical storage device, or other appropriate computer-readable medium or storage device.

Any suitable programming language can be used to implement the routines, methods or programs of embodiments of the invention described herein, including C, C++, Java, JavaScript, HTML, or any other programming or scripting code, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code an of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more general purpose digital computers, by using application specific integrated circuits, programmable logic devices, field programmable gate arrays, optical, chemical, biological, quantum or nanoengineered systems, components and mechanisms may be used. In general, the functions of the invention can be achieved by any means as is known in the art. For example, distributed, or networked systems, components and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer readable media storing computer instructions translatable by one or more processors in a computing environment.

A "processor" includes any hardware system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/Figures should be considered only as exemplary, and not limiting, unless otherwise specifically noted.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited to only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present).

Although the foregoing specification describes specific embodiments, numerous changes in the details of the embodiments disclosed herein and additional embodiments will be apparent to, and may be made by, persons of ordinary skill in the art having reference to this disclosure. In this context, the specification and figures are to be regarded in an illustrative rather than a restrictive sense, and all such modifications are intended to be included within the scope of this disclosure.

What is claimed is:

1. A system, comprising:
a processor; and
a computer readable medium storing instructions translatable by the processor to implement a multilingual search engine, comprising instructions for:
receiving a multilingual document;
determining a set of fragments of a content of the multilingual document, wherein each of the set of fragments comprises a portion of the content of the multilingual document;
determining an index language associated with each fragment of the determined set of fragments of the multilingual document;
based on the index language, indexing each fragment in a multilingual object index in association with the multilingual document, wherein the multilingual object index includes tokens from the multilingual document in multiple languages determined according to their respective index language;
receiving a search query; and
performing the search query by:
determining a set of search fragments of the search query, wherein each of the set of search fragments comprises a portion of the search query;
determining a search language associated with each search fragment of the determined set of search fragments; and
based on the search language associated with each search fragment, indexing each search fragment in a multilingual search index in association with the search query; and
performing a search of the multilingual object index according to the search query based on the multilingual search index.

2. The system of claim 1, wherein indexing each fragment is performed using a language specific model for the index language.

3. The system of claim 2, wherein the indexing of each search fragment is preformed using a language specific model for the search language.

4. The system of claim 3, wherein the language specific model for the index language is different that then language specific model for the search language.

5. The system of claim 1, wherein each fragment is indexed in a single field.

6. The system of claim 1, wherein the multilingual search index comprises tokens of the search fragments according to their respective associated search language.

7. The system of claim 6, wherein the multilingual search index is temporarily stored while performing the search.

8. A method, comprising:
receiving a multilingual document;
determining a set of fragments of a content of the multilingual document, wherein each of the set of fragments comprises a portion of the content of the multilingual document;
determining an index language associated with each fragment of the determined set of fragments of the multilingual document;
based on the index language, indexing each fragment in a multilingual object index in association with the multilingual document, wherein the multilingual object index includes tokens from the multilingual document in multiple languages determined according to their respective index language;
receiving a search query; and
performing the search query by:
determining a set of search fragments of the search query, wherein each of the set of search fragments comprises a portion of the search query;
determining a search language associated with each search fragment of the determined set of search fragments; and
based on the search language associated with each search fragment, indexing each search fragment in a multilingual search index in association with the search query; and
performing a search of the multilingual object index according to the search query based on the multilingual search index.

9. The method of claim 8, wherein indexing each fragment is performed using a language specific model for the index language.

10. The method of claim 9, wherein the indexing of each search fragment is preformed using a language specific model for the search language.

11. The method of claim 10, wherein the language specific model for the index language is different than language specific model for the search language.

12. The method of claim 8, wherein each fragment is indexed in a single field.

13. The method of claim 8, wherein the multilingual search index comprises tokens of the search fragments according to their respective associated search language.

14. The method of claim 13, wherein the multilingual search index is temporarily stored while performing the search.

15. A non-transitory computer readable medium, comprising instructions for:
receiving a multilingual document;
determining a set of fragments of a content of the multilingual document, wherein each of the set of fragments comprises a portion of the content of the multilingual document;
determining an index language associated with each fragment of the determined set of fragments of the multilingual document;
based on the index language, indexing each fragment in a multilingual object index in association with the multilingual document, wherein the multilingual object index includes tokens from the multilingual document in multiple languages determined according to their respective index language;
receiving a search query; and
performing the search query by:
determining a set of search fragments of the search query, wherein each of the set of search fragments comprises a portion of the search query;
determining a search language associated with each search fragment of the determined set of search fragments; and based on the search language associated with each search fragment, indexing each search fragment in a multilingual search index in association with the search query; and performing a search of the multilingual object index according to the search query based on the multilingual search index.

16. The non-transitory computer readable medium of claim 15, wherein indexing each fragment is performed using a language specific model for the index language.

17. The non-transitory computer readable medium of claim 16, wherein the indexing of each search fragment is preformed using a language specific model for the search language.

18. The non-transitory computer readable medium of claim 17, wherein the language specific model for the index language is different than then language specific model for the search language.

19. The non-transitory computer readable medium of claim 15, wherein each fragment is indexed in a single field.

20. The non-transitory computer readable medium of claim 15, wherein the multilingual search index comprises tokens of the search fragments according to their respective associated search language.

21. The non-transitory computer readable medium of claim 20, wherein the multilingual search index is temporarily stored while performing the search.

* * * * *